Oct. 1, 1963  G. H. ANDERSON  3,105,487
STOVE FOR ICE FISHING
Filed July 30, 1962

INVENTOR
GORDON H. ANDERSON

BY *H. Yates Dowell*
ATTORNEY 3,105,487
STOVE FOR ICE FISHING
Gordon H. Anderson, P.O. Box 694, Huron, S. Dak.
Substituted for abandoned application Ser. No. 725,570, Apr. 1, 1958. This application July 30, 1962, Ser. No. 218,194
2 Claims. (Cl. 126—271.3)

This invention relates to fishing and trapping and to equipment employed in the pursuit of such activities and more particularly to auxiliary equipment for facilitating such practices and which articles of equipment are essential adjuncts of such activities.

The invention relates specifically to a stove for use in ice fishing by means of which heat can be supplied to prevent or retard the formation or accumulation of ice which would prevent the fishing from being interrupted.

In cold regions, temperature plays an impjortant part in the activities of such area including fishing through the ice due to the fact that the water freezes ice in the opening through which the fishing is done and renders floats or the like in such opening useless while frozen including rods when the equipment and the opening through which the fishing is done is left unattended or without constant surveillance.

It is an object of the invention to overcome the difficulties enumerated by providing means for preventing the freezing of an opening through which fishing is done with the freezing thereto of the fishing tackle or part thereof and to provide a stove or heating means for affording adequate heat to prevent freezing.

Another object of the invention is to provide a stove in the form of a hood or cover for an opening through which fishing is accomplished and a support for heating means within such hood or cover, as well as a stove and supporting means therefore constructed to provide extended support for the weight of the stove to prevent the heat from the stove from melting the ice allowing the stove to fall through the ice.

Another object of the invention is to provide a stove of a material and color, such metal painted black, which will absorb heat from the rays of the sun and therefore reduce the amount of artificial heat required during certain periods.

Figure 1:
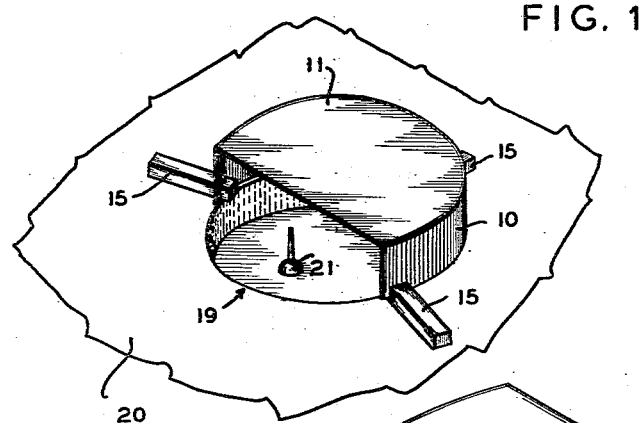
Figure 2:
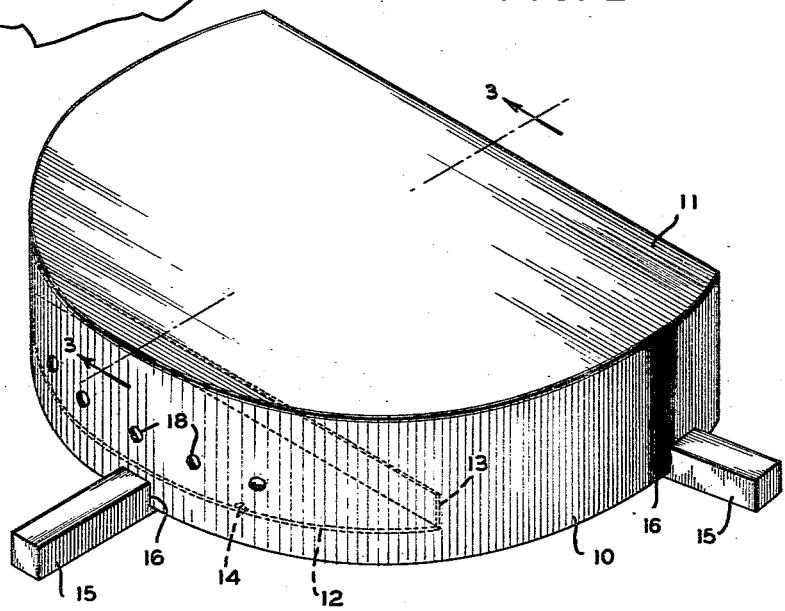

Other objects and advantages of the invention will be apparent from the following description taken in conjunction with the accompanying drawing wherein:

FIG. 1 is a perspective illustrating one application of the invention;

FIG. 2, a perspective viewed from the opposite or rear-side, and

Figure 3:
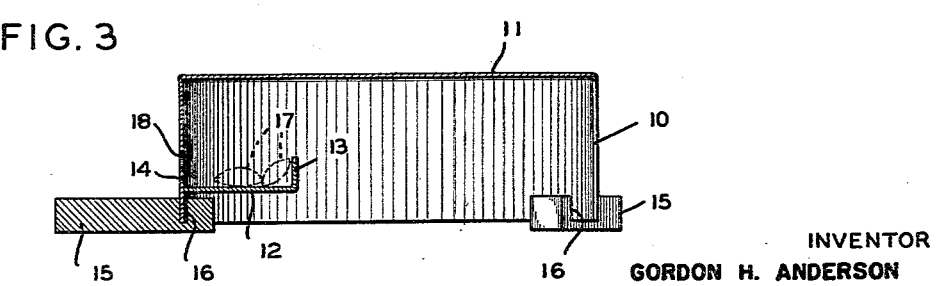

FIG. 3, a section on the line 3—3 of FIG. 2.

Briefly stated the stove of the present invention is a hood or canopy for a hole in the ice through which fishing is done. This hood has a curved upright wall with an access opening at one side and a cover or top. A support in the form of a ledge or shelf is mounted within the housing formed by the upright wall and cover at a location remote from the access opening on which support heating means is adapted to be held, said upright wall having draft openings therein and horizontally disposed means is provided for supplementing the supporting of wall and cover.

With continued reference to the drawing the stove of the present invention comprises essentially a hood or housing having an upright generally circular wall portion 10, a cover or top 11 similar to but slightly greater than a semi-circle, and a support 12 with a retaining flange or ledge 13. The support 12 is adapted to be fastened to the side wall 10 by welds 14 or other desired fastening means.

In order to provide additional support for the lower edge of the wall 10 such wall may be provided with lateral or right angular projections and if preferred these may be independent members 15 which may have cross kerfs or slots 16 in which the lower edge of the wall 10 may be received.

The hood or housing formed of the wall 10 and cover 11 is adapted to contain heating means of any convenient or desired character such as for example charcoal 17 on the shelf or ledge 12 thereby to supply heat to the adjacent area, the wall 10 being open at one side and having draft openings or passages 18 at the remote part of such wall from the open side thereof. Thus when the device is placed over a hole 19 in the ice 20 in or through which fishing is done using for example a float 21, and heating means is located on the ledge or shelf 12 heat will be supplied in the vicinity of the hole to deter the freezing of the water therein and permits a fishing line to be left unattended for a relatively long period of time even when the temperature is relatively low.

The wall and cover of the stove of the present invention may be of any desired material. However, in order to facilitate the absorption of heat from the sun they should be of metal of good heat conductivity and preferably painted black to improve heat absorption. The stove, however, may be of any other desired material.

When the stove is of metal of good heat conducting properties the supporting members 15 should have at least the portion in contact with the wall 10 of wood or other poor conductive material or if preferred, the members 15 entirely of such material as illustrated. The stove of the present invention may be easily applied or installed and heating means installed therein for producing heat to keep the adjacent area from freezing.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A stove for supplying heat to prevent water from freezing in a hole through ice over a body of water comprising a low arcuate side wall having its ends spaced apart an appreciable distance so that a line between the ends of the arcuate side wall defines a chord across the arc, a cover extending over the arcuate wall and permanently secured to the upper edge thereof with the bottom of the arcuate wall being open and the side between the ends of the arcuate wall being open, a shelf support mounted on an intermediate portion of the arcuate wall and interiorly thereof between the cover and the bottom edge of the side wall, said shelf extending along the inner periphery of the arcuate wall and terminating in a chord spaced a substantial distance from the chord defined by the ends of the arcuate wall, said shelf having an upstanding fuel retaining flange at its chord edge with the upper edge of the fuel retaining flange spaced from the cover to provide for supplying fuel and removing waste products, whereby a fuel retaining pocket is provided by said shelf, said retaining flange, and said intermediate portion of the arcuate wall, said intermediate portion of said arcuate wall being provided with aperture means adjacent the shelf for supplying air for combustion, said stove being adapted to be placed over an opening in the ice with the intermediate portion of the arcuate wall on the windward side whereby air for combustion passes through said aperture means in the intermediate portion of the arcuate wall, said stove providing sufficient heat to maintain an opening in the ice free of ice formation by heat supplied from fuel on said shelf or by heat absorbed from the sun, the open side defined by the ends of the arcuate wall and the adjacent edge of the cover providing for unimpeded access of a fisherman to fishing equipment within the opening of the ice.

2. The invention according to claim 1 in which a plurality of insulating supports are provided in at least three positions along the bottom edge of the arcuate wall, each insulating support comprising an elongated member having a transverse slot at one end extending only partially through the elongated member snugly receiving the lower edge portion of the arcuate wall whereby the stove can be supported over a hole in the ice of larger diameter than the transverse dimension of said stove.

References Cited in the file of this patent
UNITED STATES PATENTS

| | | |
|---|---|---|
| 42,879 | Savier | May 24, 1864 |
| 2,173,166 | Hoelscher | Sept. 19, 1939 |
| 2,512,223 | Contiguglia | June 20, 1950 |
| 2,541,328 | Boklep | Feb. 13, 1951 |
| 2,618,091 | Sheraski | Nov. 18, 1952 |
| 2,677,363 | Bryan | May 4, 1954 |
| 2,747,569 | Holm et al. | May 29, 1956 |
| 2,883,784 | Obernolte | Apr. 28, 1959 |